United States Patent [19]
Santeler

[11] 3,724,169
[45] Apr. 3, 1973

[54] DELTA T BAR SPECTROMETER
[75] Inventor: Donald J. Santeler, Scotia, N.Y.
[73] Assignee: Aero Vac Corp., Troy, N.Y.
[22] Filed: Feb. 19, 1970
[21] Appl. No.: 12,602

[52] U.S. Cl. .............................55/20, 55/81, 55/209
[51] Int. Cl. ..............................................B01d 5/00
[58] Field of Search......................55/20, 81, 67, 209

[56] References Cited

UNITED STATES PATENTS

| | | | |
|---|---|---|---|
| 2,398,818 | 4/1946 | Turner | 55/67 |
| 3,225,520 | 12/1965 | Burow | 55/67 |
| 3,225,521 | 12/1965 | Burow | 55/67 |
| 2,813,598 | 11/1957 | Hoffman et al. | 55/81 |
| 3,064,814 | 11/1962 | Grassalli et al. | 55/81 |
| 3,398,505 | 8/1968 | Llewellyx | 55/67 |
| 3,589,169 | 6/1971 | Lafitte et al. | 73/23 |

*Primary Examiner*—Charles N. Hart
*Attorney*—Beveridge & De Grandi

[57] ABSTRACT

Analysis of constituents of the atmosphere, particularly in the range from 1 PPM to 1 PPB, requires a many-fold factor of concentration, such as $10^5$, before normal detection and analysis measurement can occur. Gages are selectively condensed at temperatures in a gradient maintained along a thermally conductive surface in a vacuum chamber in a gas flowing at a rate adjusted to cause substantially complete separation of zones of condensation for the gas and its impurities or the contaminants and constituents of an atmosphere to be investigated. A temperature gradient is maintained along the exterior of a bar in a vacuum chamber or within a conductive tube through which the gas sample passes. Close control of gas flow diffusion rate, and condensing surface temperature is established between two fixed temperature points as in a tube cooled at one end by liquid nitrogen, for effective separation along the tube wall of constituents. Measurement of the composition of a flowing gas sample, after condensation, is effected through successive component evaporation either into a vacuum or into a carrier gas in a reverse flow to an apparatus such as a mass spectrometer, commencing at the low temperature end. The Δ T bar separates each of the constituents including trace contaminants in a gas to permit successive recovery of the purified or concentrated components in timed sequence according to a controlled temperature rise along the Δ T bar.

35 Claims, 18 Drawing Figures

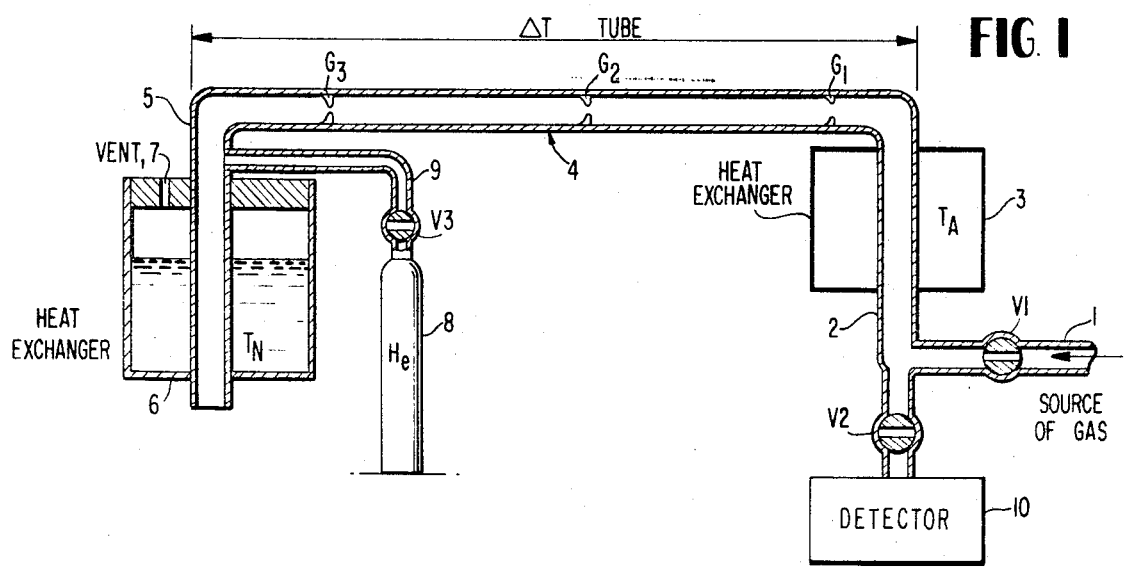
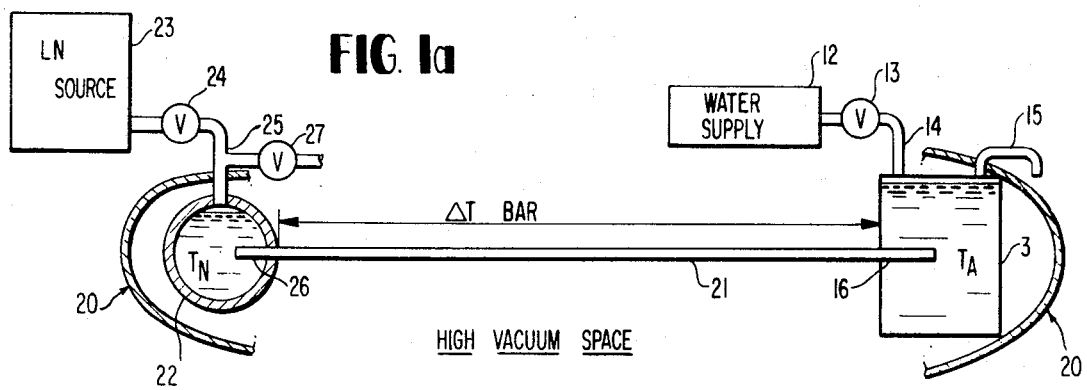
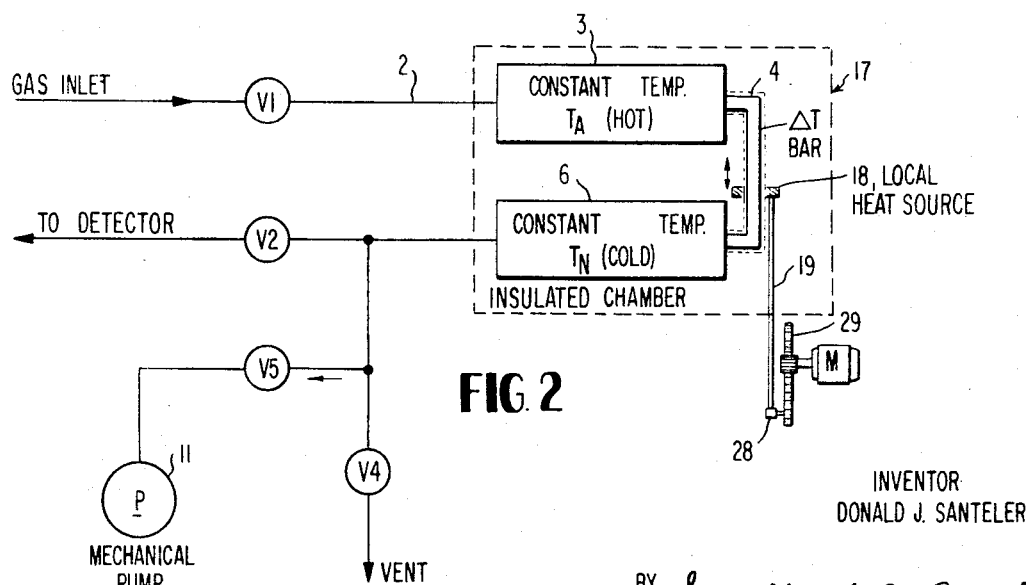

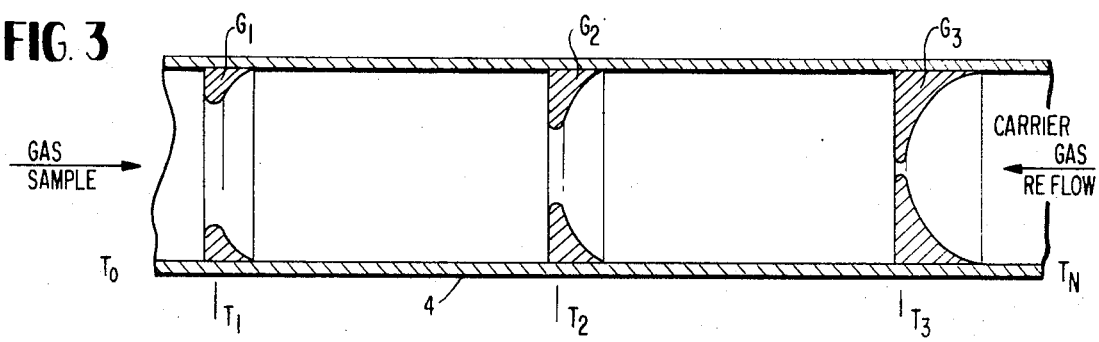
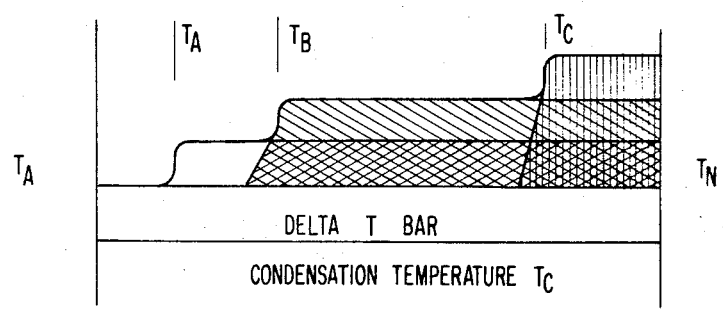
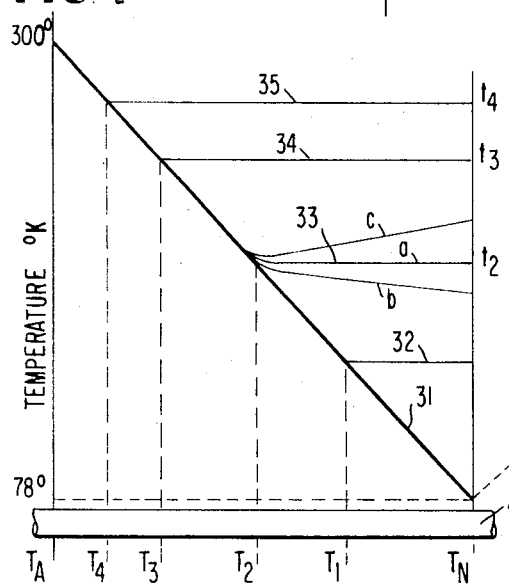
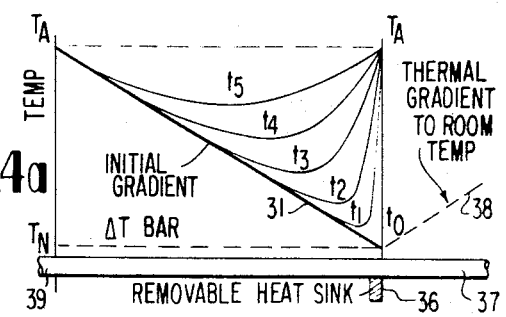
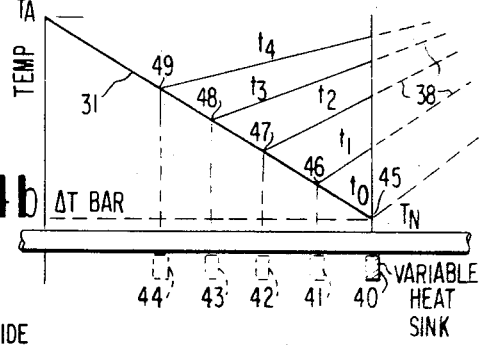
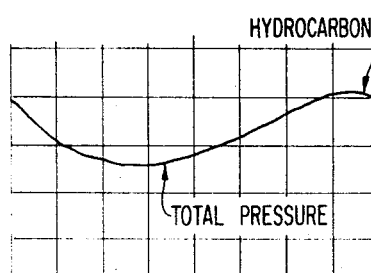
INVENTOR
DONALD J. SANTELER
BY Beveridge & De Grandi
ATTORNEYS

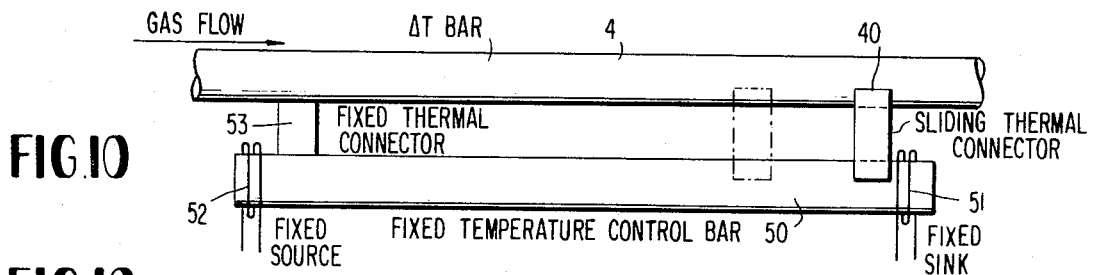
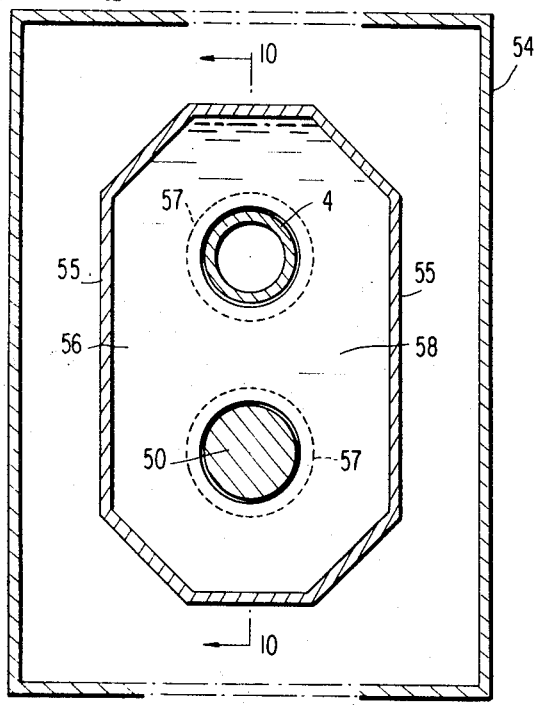
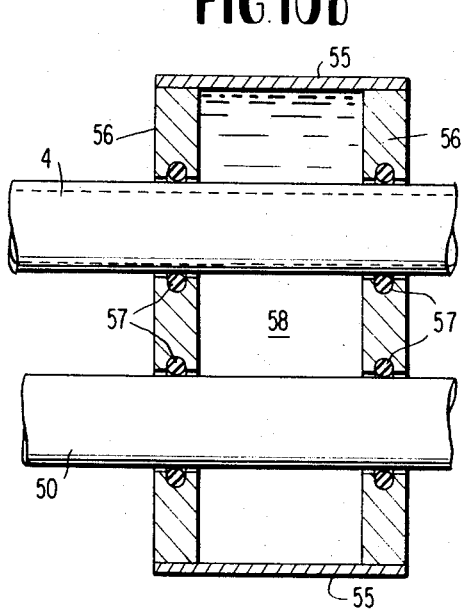
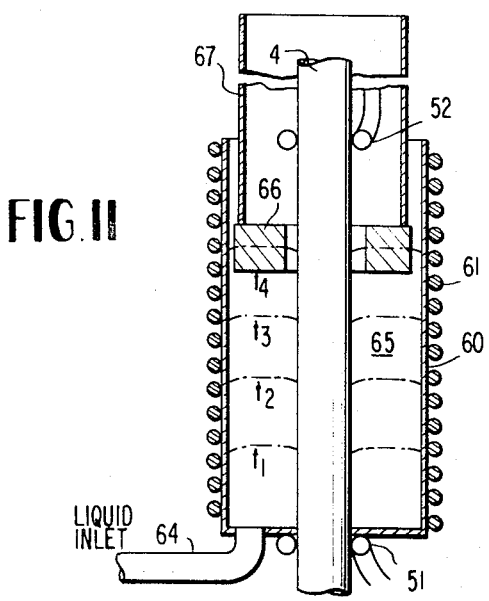
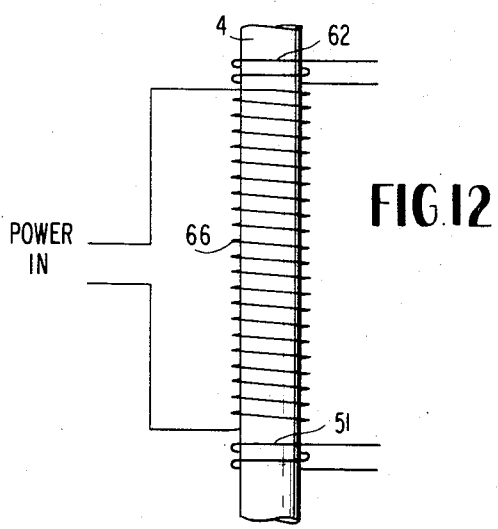
INVENTOR
DONALD J. SANTELER
BY Beveridge & De Grandi
ATTORNEYS

DELTA T BAR SPECTROMETER

SUMMARY OF THE INVENTION

While it has been known to separate gases on a large scale by condensing constituents of a mixture of gases by passage through regions successively lowered in temperature, as in the recovery of hydrocarbons, or in a continuous fractional distillation process, there has not heretofore been any available method or apparatus for analysis of trace quantities of gas in an atmosphere by a controlled condensation procedure which first concentrates the components and then removes the condensates for analysis in purified form.

The present invention provides such a method in an apparatus for the simultaneous concentration, in zones along a fixed gradient thermal conductor, of the various components of an atmosphere, including trace gases, and for the sequential removal of the concentrated components for analysis by mass spectrography or other detection technique now available. This invention utilizes a thermally conductive plate or bar maintained at a fixed temperature gradient in a vacuum chamber, or a temperature gradient tube through which the mixture passes in intimate contact at a flow rate causing the constituents to be removed, each at its own condensing temperature for the partial pressure existing, as the gas is cooled to the successively lower temperatures along the gradient. This temperature gradient condensing element is variously referred to as "$\Delta T$ bar" or "$\Delta T$ tube". "Condensing" as herein used refers to producing a change of state of constituents from gas to either a liquid or solid form at the respective condensation temperatures existing along a thermally conductive surface. "Normal vapor pressure" as herein used denotes that vapor pressure for a gas which would correspond to equilibrium between a gas and a condensate surface at the specific temperature considered.

Recovery of condensates is by slowly heating selected regions of the bar, beginning at the low temperature end while rigidly maintaining the gradient for regions at higher temperatures so that evaporated condensates move through regions of higher temperature to a detector. A recording device may be connected to the detector to trace out a curve of an electrical signal proportional at each zone to the amount of gas evaporating from the warming surface, the composite curve then registering a magnitude either as peaks or areas proportional to the gas quantity condensed as liquid and/or solid deposits built up along the $\Delta T$ bar. The invention contemplates tube dimensions coordinated with the gas flow rate to provide full diffusion for sharply defined zones and samples such that a complete sample may be passed through for condensation before any single component builds up a solid deposit sufficient to choke the flow. Minute gas traces in a mixture are concentrated over long periods of time so they may be released separately and singly in brief intervals for detection in relatively pure form thus to effectively multiply the concentration for analysis by a factor approaching $10^6$, with corresponding gain in accuracy of analysis.

When a $\Delta T$ bar is used for concentration of residual gases in a large vacuum chamber gas flow in uncontrolled and the condensed constituents are sharply zoned only at respective maximum temperatures for condensation, but also deposit on all portions of the bar at lower temperatures, producing overlap which does not occur in controlled flow above-noted. Recovery for analysis then requires both time and type identification, later described.

It is accordingly an object of the invention to provide a method of concentrating both gross and trace constituents for measurement and an apparatus for spacially separating in zones the constituents present whether in large or miniscule proportions.

Another object is to provide apparatus and method for readout in succession quantitative data respectively representing the relative concentrations of each principal gas and trace contaminant in an atmosphere condensed in zones along a thermal gradient.

A further object is to provide means for detection and analysis of residual gases in a vacuum chamber employing $\Delta T$ bar condensation without controlled gas flow wherein readout is according to progressively increasing temperature constituents recovered being separately identified by time sequence.

Other features will be apparent from the description taken with the drawings, in which:

FIG. 1 is a schematic diagram of a $\Delta T$ tube apparatus for concentrating and analyzing constituent parts of a gas sample utilizing carrier gas desorption;

FIG. 1a is a diagram of a $\Delta T$ bar apparatus useful in a high vacuum chamber;

FIG. 2 is a diagrammatic showing of apparatus for a gas analysis process utilizing desorption under vacuum;

FIG. 3 is a fragmatic sectional view of a $\Delta T$ tube showing accumulation of condensed liquid and/or solidified gas constituents spaced along a $\Delta T$ tube, illustrating recovery by carrier gas reflow;

FIG. 3a is a diagram showing overlapping deposits of condensed gas on a $\Delta T$ bar located internal to a vacuum system wherein the residual system gas has full access to the entire $\Delta T$ bar;

FIG. 4 is a diagram illustrating two idealized temperature distributions along a $\Delta T$ bar after different time intervals during a warming cycle for successive evaluation of condensates;

FIG. 4a is a diagram of a temperature rise causing undesired mixing of stripped gases due to temperature creep up the gradient as the cold end is warmed;

FIG. 4b is a diagram of desirable temperature distribution wherein temperature creep in the $\Delta T$ bar is avoided during gas stripping;

FIG. 5 illustrates a total pressure trace corresponding to certain gases evaporated from a $\Delta T$ bar under vacuum conditions;

FIG. 10 is a diagram of apparatus for controlling precisely the temperature of the $\Delta T$ bar for successive stripping of condensates;

FIG. 10a is a diagram of a detail of a sliding thermal connector as in FIG. 10;

FIG. 10b is a sectional view of the connector of FIG. 10a taken at lines 10—10;

FIG. 11 illustrates an alternative means for controlling the temperature of warm-up beginning at the cold end; and FIG. 12 illustrates a further means of stripping gas from the tube in which the entire tube is warmed uniformly from the lowest temperature.

OPERATING PRINCIPLES OF THE INVENTION

Figure 6:
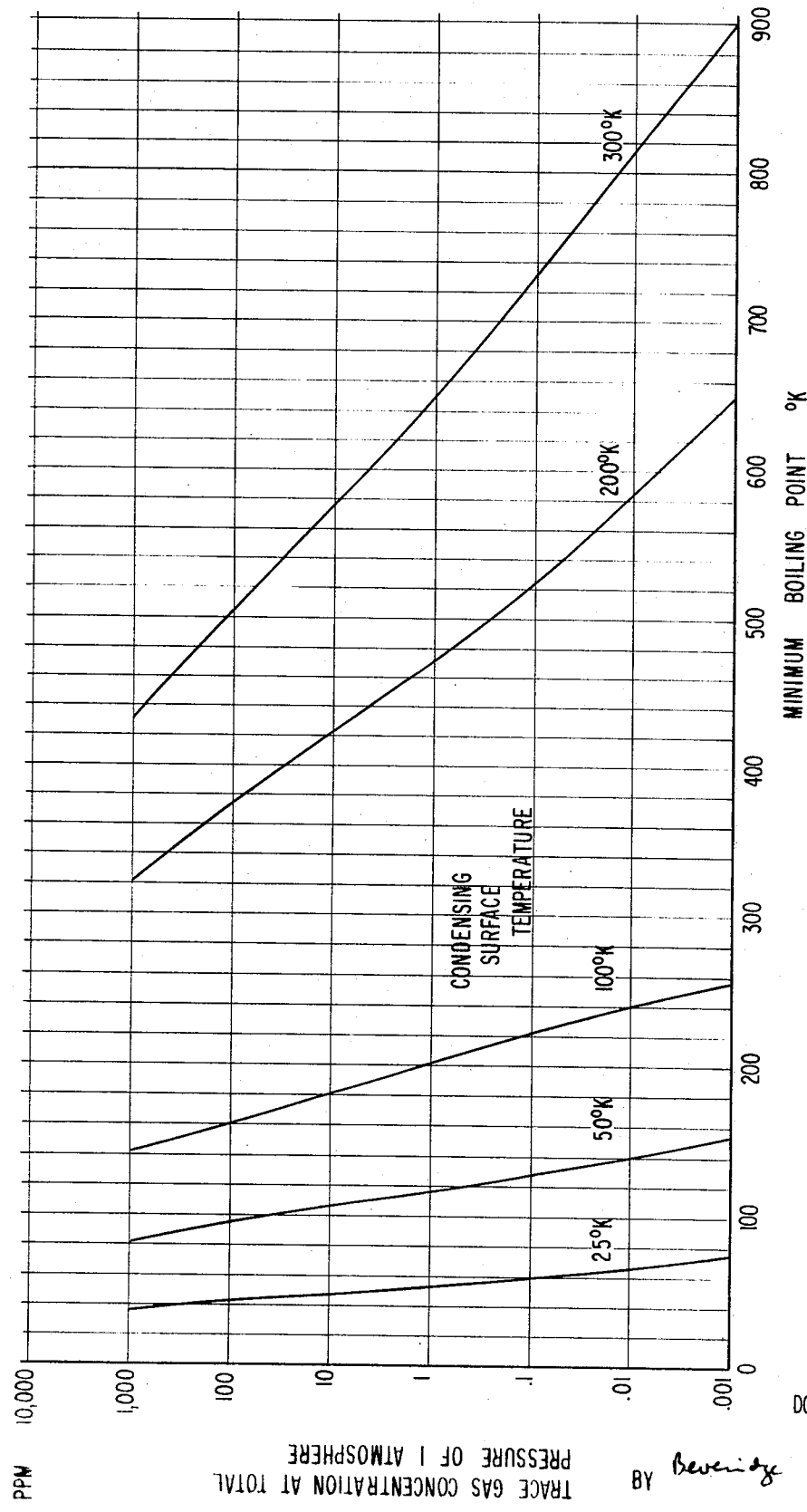
FIG. 6 shows the relationship for different condensing surface temperatures of partial pressure of a gas in a mixture at 1 atmosphere total pressure plotted against boiling points.

Proceeding now with a general discussion of the basic technical aspects of a $\Delta T$ bar spectrometer according to this invention we first note that enrichment of a constituent in test sample by prolonged adsorption on one or more fixed temperature surfaces, followed by analysis during desorption has been previously used in vacuum research applications. Available enrichment is a direct function of the ratio of collection time to evolution time. This concept has been implemented by placing successively colder surfaces in series along a gas flow to separately condense different constituents on surfaces which can then be separated and the product measured. However, this invention seeks to provide a practical apparatus for the use of these factors in a continuously operative process for separation and/or measurement by condensing all components on the same surface which has maintained thereon a desired temperature gradient between two reference temperatures, referred to herein as a $\Delta T$ bar. By employing a $\Delta T$ bar it become possible to avoid the need for disassembly for measurement providing a continuously operative (except for brief desorption intervals) detector system for a space surrounding the $\Delta T$ bar, which may be a vacuum chamber or an insulated gas conduit. When pressures sufficient for reliable gas flow are available the gas may be passed through a thermally-conducting tube which becomes the $\Delta T$ bar when controlled according to the desired temperature gradient. Gases separated into zones of condensation are then removed in successive order as later shown without disrupting the operation of the apparatus or disassembling apparatus to examine the collecting surfaces.

It is here noted that the temperature at which a particular constituent will condense is related both to its vapor pressure and to its partial pressure. This may be seen from a familiar example in which the condensation of water vapor from the atmosphere on a cold surface occurs with only a small decrease of temperature when the air is nearly saturated, but requires a very large decrease in temperature in order to occur when very little moisture is present, since a cold water glass collects dew rapidly at conditions of high humidity while hoar frost or rime forms only at very low temperatures when the absolute humidity of the atmosphere is low. Conditions for condensation of other gases are similar to those for water, depending upon the normal vapor pressure for each gas at the temperatures under consideration as well as the partial pressure of that particular gas present in the sample. Generally, when the vapor pressure due to a particular gas in a sample is constant we have a fixed partial pressure (at any particular temperature) which will then vary with temperature only according to the conventional gas laws. However, the vapor pressure for that gas is a function of temperature, generally decreasing at its own particular rate until a point is reached at which the partial pressure equals the vapor pressure of the liquid, at which point condensation commences.

Thus, if a thermal gradient is created along a thermally conductive substrate, which may be a plate, bar or tube, placed in the atmosphere or in the vacuum chamber of interest, a reasonably sharp transition will occur between a dry surface above that particular gas condensation temperature and a moistened surface occurring at and below that particular temperature. Temperature measurement of this transition will determine what is generally referred to as the dew point. At all temperatures below the dew point collection of essentially all of the arriving vapor will occur if the sample is held for a sufficient time at that temperature. When different condensable gases are in the atmosphere each will have its own particular transition temperature or dew point, depending on its own prevailing partial pressure and on its normal vapor pressure. If a surface is exposed to passing gases, which surface is subjected to a temperature gradient, and the gas is passed along this surface from the warm toward the cold end regions of condensate for different gases occur as generally illustrated in FIG. 3. Separation of gases by progressive contact with a $\Delta T$ bar is to be distinguished from overlapped condensate as in FIG. 3a wherein residual gas has access to the entire cooled surface at once, thus to accumulate as condensates along the entire cooled portion held below the condensing temperature, separation during desorption being then not realized.

GENERAL DESCRIPTION — GAS SEPARATION

Progressive cooling is thus utilized by this invention to separately condense or adsorb gases on the temperature gradient surface in zones each of the gases present later being desorbed sequentially for measurement. A typical condensation concentrator setup appears in FIG. 2, for which typical apparatus is illustrated in FIG. 1. Considering FIG. 2, gas will flow into the apparatus by way of valve V1 and condense along the substrate tube or bar. Non-condensable gases flow out open valve V4, to a vent or to a chamber at controlled pressure.

Apparatus according to FIG. 1a for determining gas residuals in a vacuum chamber comprises a $\Delta T$ bar wholly disposed in the chamber, or in an auxiliary chamber with wide mouth connections to the main chamber. It is shown without a source of gas or a pump since these are part of the system being tested. The $\Delta T$ bar is otherwise functionally like that of FIG. 2 except that no viscous gas flow is involved.

FIG. 3 shows a typical concentration resulting from the passage of three adjacently condensable atmospheric gases through a temperature gradient tube, the tube being shown in fragment to simplify the description. For example, gas $G_1$ is condensed at a temperature indicated at $T_1$, this constituent being in relatively minor concentration in the gas sample. Gas $G_2$ is condensed within the tube at a temperature designated $T_2$ while gas $G_3$ is collected in greater quantity at the location within the tube indicated at $T_3$. It will be understood that the gas sample is introduced at the hot end at some fixed temperature $T_A$ which is higher than the highest condensation temperature for any gas in the tube, and that any non-condensed gas emerges from the tube at a second fixed temperature $T_N$. Gas reflow for sequenced evolution of the condensed products is occasioned by flowing a carrier gas in a reverse direction as illustrated in FIG. 3.

GENERAL DESCRIPTION — PRODUCT READOUT

After the collection period valves V1 and V4 of FIG. 2 are closed for readout while valve V5 is opened to a pump 11 to remove any gases not yet exhausted or condensed within the range of the temperature gradient along the $\Delta T$ bar; the pump is then shut off by closing valve V5. Thereupon the operator can progressively raise the temperature at successive zones beginning at the cold end of the $\Delta T$ bar so as to produce time spaced desorptions of adsorbed gases, valve V2 being then opened to permit the desorbed gases to flow to a suitable gas detector, usually operated at high vacuum.

When valve V2 has been opened and the spectrometer or other measuring device, having continuous recording characteristics, is activated, a curve such as that shown in FIG. 5 results. This differs somewhat from the idealized spectrum of FIG. 9 due to overlapping of condensate during deposition at incorrect flow rate and/or large devication from the idealized warming curves of FIG. 4 and indicates some overlapping in time sequence for desorption of products from a complex mixture being analyzed, in which height of the curve indicates total gas pressure showing peaks, for example at one point corresponding to a particular hydrocarbon and at another corresponding to carbon dioxide desorption.

DETAILED DESCRIPTION

Suitable apparatus for trace gas concentration and desorption into a carrier gas for measurement is illustrated in FIGS. 1, 1a, and 2. FIGS. 10, 10a, 11 and 12 illustrate means for sequential stripping of the gas constituents from the $\Delta T$ bar without a carrier gas. In FIG. 1 a gas source is admitted by way of conduit 1 to a valve V1 whence it passes by conduit 2 through a heat exchanger 3 held at an ambient temperature $T_A$, or other hot end temperature, and thence passes into the $\Delta T$ tube shown generally at 4. From the $\Delta T$ tube portion of the apparatus the gas is passed via conduit 5 to a heat exchanger 6 held at temperature $T_N$, indicated by way of example as a liquid nitrogen bath vented at 7. Thermal insulation aspects are omitted from FIG. 1 but it is to be understood that insulation is provided according to conventional practice as a surrounding thermal box, or in a vacuum chamber. Inasmuch as some gases from the sample may not be condensable at the lowest tube temperature tube 5 is shown open beyond 6 whence this noncondensed portion of the sample may be vented from the system or collected for use. Desorbed gases may be picked up for measurement by a carrier gas such as helium supplied from a tank shown at 8 by way of a valve V3 and a conduit 9, in which backflow carrier gas moves successively past the condensed gas portions $G_3$, $G_2$ and $G_1$ to detector 10 by way of valve V2, normally held closed when V1 is open. V1 is closed when V2 and V3 are opened for backflow. Rate of carrier gas backflow is preferably sufficient to prevent backstreaming of any portion of $G_3$, $G_2$ or $G_1$, so that recondensation does not occur in the colder regions as the more volatile constituents are released in tube 4.

FIG. 2 illustrates a desorption into a vacuum, gas analysis methods ordinarily being operative under vacuum conditions, the carrier gas being unnecessary for detectors such as a mass spectrometer.

In FIG. 1a 20 illustrates generally a high vacuum chamber containing residual gases such as a pumped down atmosphere with impurities or contaminants which it is desired to measure. The entire apparatus id disposed within chamber 20. In this instance heat exchanger 3 is held at a fixed hot end temperature $T_A$, e.g. by water from a supply 12 through valve 13 and conduit 14 passing out of the heat exchanger by way of outlet 15. A low temperature end heat exchanger is shown at a temperature $T_N$ in a chamber 22 being supplied from a source 23 such as liquid nitrogen or liquid hydrogen by way of valve 24 in conduit 25. Chamber 22 may be supplied with a vent in order to avoid the accumulation of vaporized coolant. $\Delta T$ bar 21 has one end 16 inserted in heat exchanger 3 and a second end 26 inserted in heat exchanger 22. Arranged in this fashion the apparatus of FIG. 1a is suitable for residual gas measurement at very high vacuum conditions, ordinarily with a resulting overlapping of condensates as illustrated at FIG. 3a, but nevertheless separating into zones the various gas constituents contained in a residual atmosphere or introduced as impurities in a pumped space. These may be analyzed by removing the $\Delta T$ bar to a laboratory or may be warmed in place with detection of evolved gases as each new constituent is evolved in a warming cycle according to one of the warming arrangements hereinafter described where the $\Delta T$ bar is in an auxiliary chamber valvedly separatable from the main vacuum chamber.

It will also be understood that the $\Delta T$ bar 21 of FIG. 1a may be of any shape whether of a rod, tube or plate. In the case of higher pressures where gas analysis is desired the analytical capabilities of the apparatus are improved by the use of a $\Delta T$ tube as shown in FIG. 1 or FIG. 2 or an equivalent structure where the gas passes from one end to the other within the tube itself. The tube material is selected for suitable thermal conductivity such as silver, copper or aluminum. Also the gas passes from the warm end through the tube to the cold end at a controlled duration and rate such that no one of the gas constituents causes a plugging of the tube before a complete test sample volume has been passed therethrough. Whichever arrangement is used a first "hot" temperature ($T_A$) is held at, below or above the ambient temperature and the opposite end at "cold" temperature ($T_N$) sufficiently below $T_A$ to provide condensation of the constituent gases of interest. A constant temperature gradient is maintained along the tube length by choice of wall thickness and thermal conductivity to prevent liberated heat of condensation or heat losses from materially altering the bar temperature adjacent to the points of gas condensation. Radiation and convection heat changes have to be kept low in relation to the thermal conductivity of the bar as heat moves along the bar from heat exchanger 3 to heat exchanger 6, so that the thermal gradient is not substantially altered. Good surrounding thermal insulation, as by vacuum, for example, materially decreases the requirements for heat flow to maintain the desired fixed thermal gradient.

A first gas $G_1$ may be condensed when the temperature $T_1$ is encountered along the $\Delta T$ bar. As gas sample proceeds along the bar there will be other temperatures $T_2$ and $T_3$ at which gases $G_2$ and $G_3$ will be condensed out in some pattern, illustratively as in FIG. 3. Many gases may be present to provide irregularly distributed points of condensation corresponding generally to the respective boiling points, between initial temperature $T_A$ and final temperature $T_N$. The condensation temperature is a function both of its partial pressure, or concentration in a mixture, and its normal vapor pressure for the particular temperature. Condensation continues along the tube according to the respective saturation vapor pressures as the temperature of the bar portion contacted decreases. Where several gases are present in a mixture at substantial pressure, the absolute temperature of condensation of course varies but the relative positions of condensation retain an ordered sequence according to the temperature of the $\Delta T$ bar. Gas will condense predominantly immediately adjacent the point on the $\Delta T$ bar at which it first commences condensing, as illustrated in FIG. 3. A more rapid flow will spread the deposition area toward the condition of overlap between adjacently deposited constituents, overlap being generally avoided by control of flow rate.

Condensation occurs when the partial pressure for the particular gas exceeds its vapor pressure for the prevailing temperature. When a warm gas cools during its passage through the thermal gradient region a temperature is reached in which condensation of a first constituent occurs. Then, as the sample proceeds to regions of lower temperatures, the same criterion applies for the next gas of the sample, which is then deposited or condensed out upon the thermal gradient surface.

Vapor pressure when plotted as a function of temperature gives similar curves for most substances so that it is possible to provide an estimate of the boiling point of any vapor found to condense at any region along the temperature gradient according to curves for various concentrations in a gas stream. Such an estimate of condensation behavior for many atmospheric and impurity gases of interest has been prepared, being represented in FIG. 6 as partial pressures, at which condensation will occur, as a function of a minimum boiling point of that particular substance at one atmosphere total pressure. Results are shown as a family of curves for different temperatures of a condensing surface on which it is desired to adsorb gas. From FIG. 6 it may be determined which gas will condense at a temperature $T_1$ when the total pressure is one atmosphere and the condensing surface is as illustrated in one of the curves of FIG. 6. It is noted that a total pressure in the $\Delta T$ tube 10 times higher causes condensation at concentrations 10 times lower than illustrated in FIG. 6.

Figure 7:
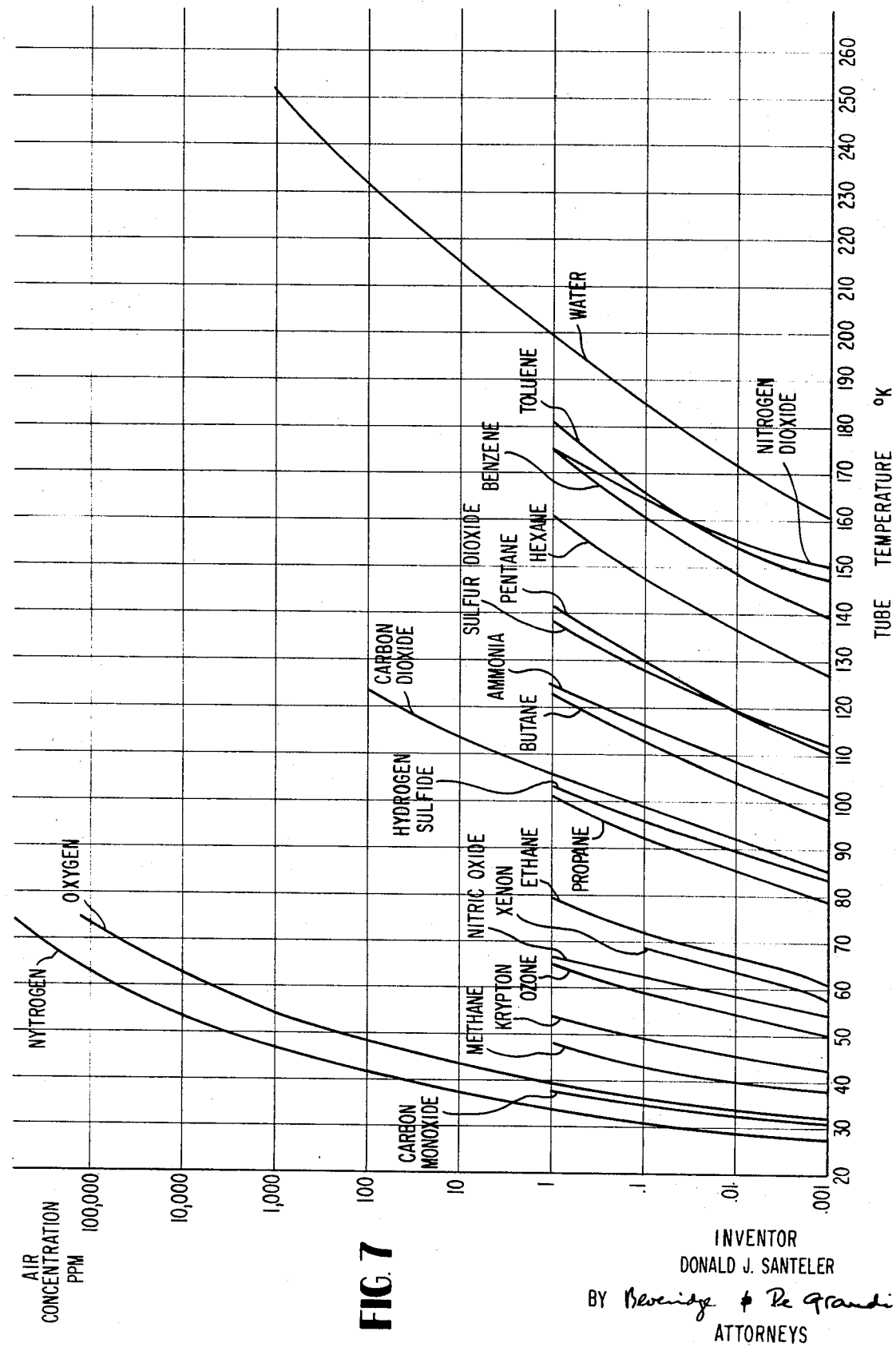
FIG. 7 is a plot of partial pressure against condensing surface temperature for various gases of interest in an atmosphere.
Figure 8:
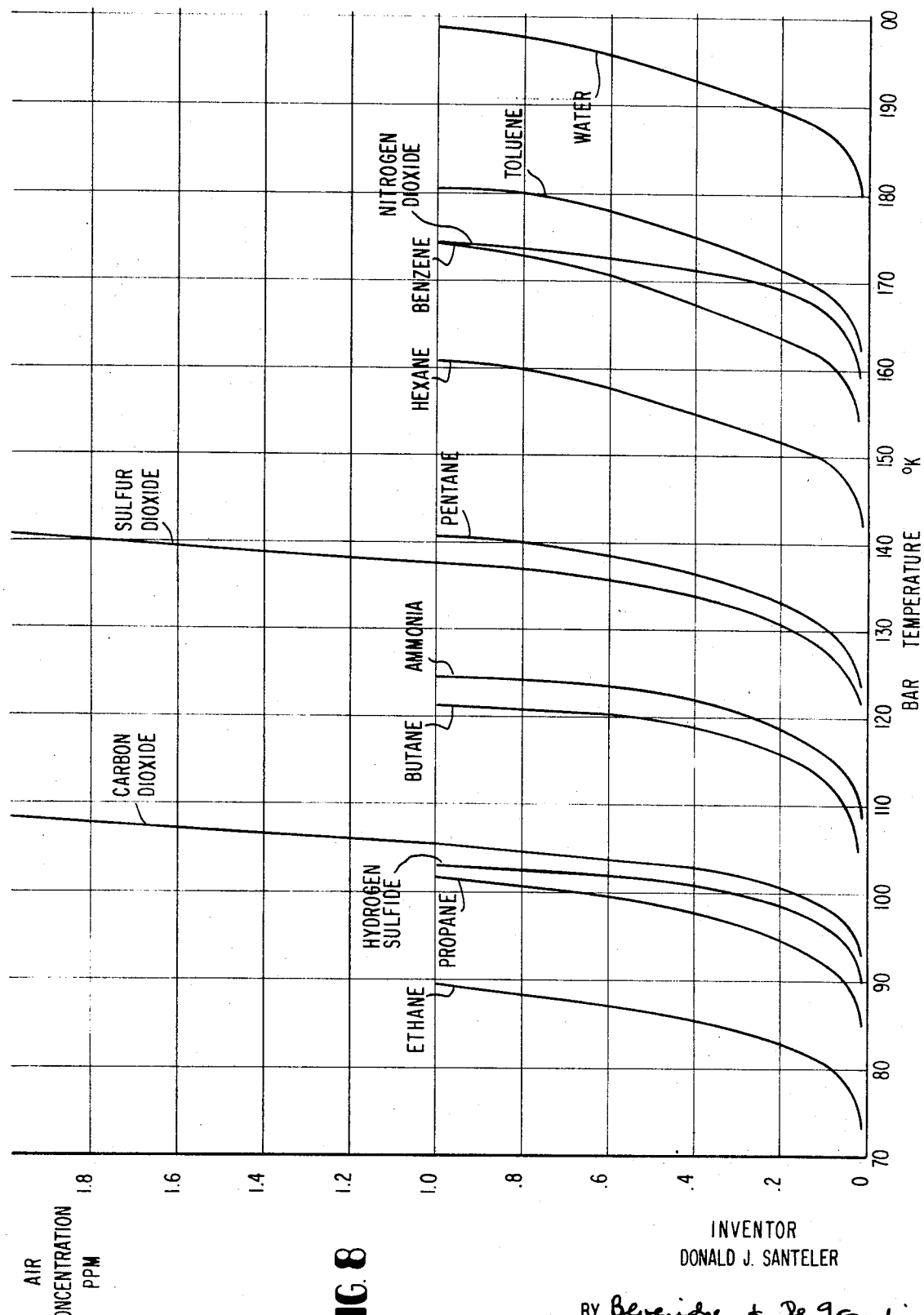
FIG. 8 is a similar plot to FIG. 7, but on a linear scale.

Utilizing the estimates of FIG. 6 a plot has been prepared as FIG. 7 of vapor pressure against the temperature for condensation for various gases which have been found in normal samples of air, and for air containing certain industrial contaminants. FIG. 7 illustrates many but not all of the gases which might be so condensed along a $\Delta T$ bar. Both higher and lower limits of temperature gradient may be used. Inorganic gases except typical ones for illustration, are not shown although a similar plot may be prepared for any gas of interest. FIG. 7 thus shows variation in tube temperature, i.e., positions along the region of fixed gradient, at which various atmospheric constituent gases are condensable at different concentrations and shows the variations in tube temperature at which this occurs as contaminant concentrations decrease from 1 part per million to 1 part per billion. It may be seen that many atmospheric gases will be condensed in the range of 30°K to 200°K at concentrations of this order of magnitude. A related plot is shown in FIG. 8 wherein the bar temperature at which condensation occurs is plotted against parts per million of the particular constituent being plotted.

Figure 9:
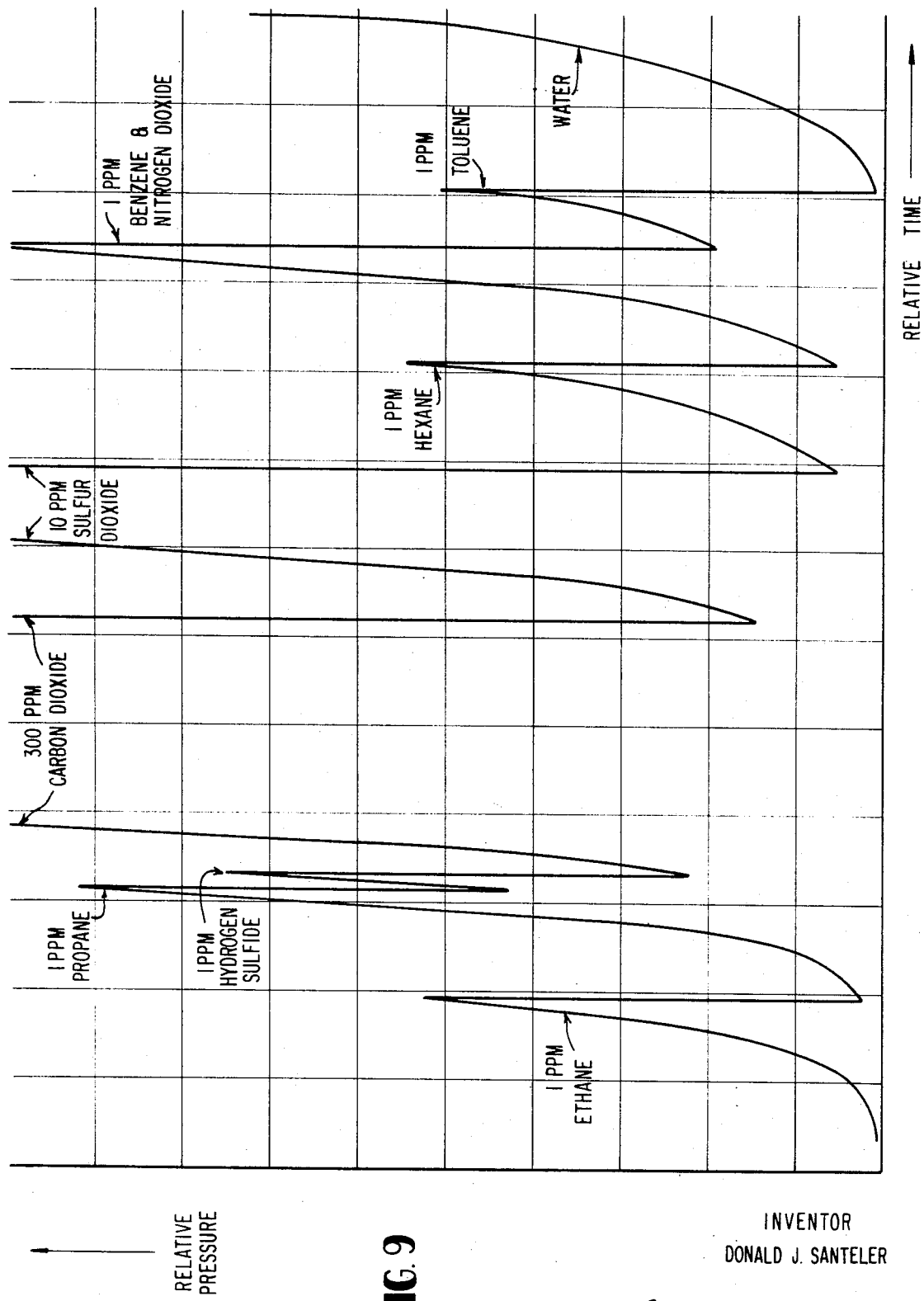
FIG. 9 illustrates relative quantities of gas in a sample boiled off in succession in accordance with progressive heating shown discontinuously in FIG. 4.

In FIG. 9 there is shown a plot of an output from a vacuum gauge, or the like, when a sample of gas has been concentrated in zones along a $\Delta T$ bar held at a desired temperature gradient and desorbed by gradual rise in temperature beginning at the low temperature end of a bar. In this plot it will be noted that gases are evolved in successive order generally according to their boiling points, even though partial pressures differ, and in quantity according to their relative concentrations in the sample. FIG. 9 represents total pressure variations with time assuming the gases are continuously pumped away.

Additional factors considered in the practice of the invention relate to the optimizing of the tube diameter in relation to flow rate and sample size. Thermal conductivity of the $\Delta T$ bar sufficient to maintain thermal equilibrium without appreciable departure of temperature from the desired linear gradient along the tube has been discussed.

Previously mentioned is the need for condensation to occur in as narrow a temperature band as possible, controlled in part by time allowed for diffusion of gases from the center of the flow toward the tube walls in the apparatus of FIGS. 1 and 2. A third factor relates to sample size to prevent plugging of the tube by solid condensates for constituents present in larger amounts. A fourth factor is that the sample size should be sufficient to permit a proper measurement in a mass spectrograph for those in trace amounts and so as to permit a very long period of condensation relative to the time required for evolution of the desorbed gas, in order to provide the needed factor of enrichment.

Thermal equilibrium between the gas and the tube walls is to be established by gas flow rate once the geometry and thermal conductivity factors of the tube are established. Condensation of a particular constituent will then occur over a broad or narrow range depending upon the completeness of the diffusion of gas radially toward the $\Delta T$ bar. It is necessary to maintain the gas flow at a sufficiently low velocity such that diffusion to the condensing surface occurs within a desirably short space along the tube, and this depends upon the proximity of the next constituent in position of deposition along the temperature gradient. From the standard diffusion equations applicable to a cylindrical body it has been determined that the time of dwell of a gas portion differing in temperature by five degrees from the next portion in a tube of 6 mm. diameter is about one third second. Temperature and distance are interrelated. A tube of 127 cm. length maintained at a gradient of between 50° and 300°K will have an average temperature drop of 2°K per cm. Linear gas velocity must therefore be less than 1.25 cm/sec. It is preferable that the diffusion to the condensing surface be sufficient to obtain 99 percent vapor pressure equilibrium with the condensate and that the tube geometry and gas flow be suitably adjusted to provide a diffusion of 99 percent of the gas to the walls within the above one-third second time limit. The rate of diffusion is generally proportional to the temperature difference and inversely proportional to the square of the tube radius. Tube dimensions and flow rate can thus be optimized for various temperatures.

As the gases condense along the tube walls, the effective tube diameter shrinks and may eventually be plugged. If 90 percent of the gas condenses in a 5° span the time to plug can be calculated. For water vapor about 7½ seconds would be required under the conditions stated. For constituents present in quantities of 100 parts per million it would take 300 times longer, or approximately 1 hour. The size of the sample must be kept smaller, to avoid plugging, if a constituent is in a high relative concentration, or the flow rate may be adjusted to spread this particular constituent along the tube toward that temperature at which the next constituent of interest begins to condense out.

In determining the quantity of gas sampled to permit detection by a mass spectrometer the required quantity is approximately $10^{-6}$ cc. If it is desired to detect a gas present as 1 part per billion, then a total atmospheric sample of 1 liter (1,000 cc.) will be required and at a maximum flow rate of 2 cc./sec., so that a condensing time of 500 seconds is required. Selection of total quantity needed for detection, but insufficient to cause tube plugging, is thus a consideration requiring investigation for various applications of this invention to air pollution determinations. In some cases it may require more than a single stage of separation for the analysis of widely differing concentrations requiring differing sample quantities to secure sufficient enrichment for analysis while avoiding plugging due to the more plentifully supplied of the constituents.

Upon completion of the condensation phase in a particular analysis, or at intervals during a continuous surveillance, an adsorption period is followed by cutting off of the gas supply when the analysis is of a moving gas stream. Under conditions of high vacuum such that there is no viscous gas flow it will be appreciated that the region of condensation for any residual gas contained in the chamber will extend from the point on the temperature gradient bar which is at maximum temperature for condensation and will continue to be adsorbed at lower temperature regions along the temperature gradient bar. In this instance the complete separation of condensates is not achieved although a series of regions beginning at the hot end and proceeding toward the cold end of the bar will be found in which first regions of condensation correspond to gases adsorbed at highest temperatures, proceeding on down to the constituents adsorbed only at lowest temperatures. The cold end of the bar accordingly has a mixture of condensates as illustrated in FIG. 3a. The stripping of condensates where overlapping occurs may be achieved in several different ways. If a single run is to be made the entire bar may be cooled to a temperature at which no condensate is evaporated and held at that temperature until the regions of the bar can be separated and warmed individually. The bar may also be warmed sequentially as later described in which the evolved gases are passed through a detector capable of tracing a continuous curve in which new peaks are observed as new constituents are added or deleted in accordance with whether the stripping is from the cold end or the warm end.

FIG. 4 illustrates an ideal set of warming temperatures applied to a temperature gradient bar as heretofore discussed. The temperature gradient bar is illustrated at fixed temperatures $T_N$, and $T_A$, for example 78°K and 300°K. It is to be understood, however, that temperatures as low as the boiling temperature for liquid helium and as high as several hundred degrees above atmospheric temperature may be employed as well as any intermediate range of temperatures along the ΔT bar. For convenience the two fixed temperatures have been referred to herein as $T_N$ and $T_A$, these being the temperatures establishing the temperature gradient along the bar during the condensation phase. When it is desired to strip the gases it is important to prevent premature stripping as the bar may be warmed from the cold end as would occur according to FIG. 4a when the cold end is merely warmed to room temperature or allowed to float toward temperature $T_A$. Ideally, the cold end of the bar is uniformly warmed through successive temperatures such as illustrated at times $t_1$, $t_2$, $t_3$, and $t_4$ of FIG. 4. However, uniform heating of the cold end of the bar necessarily produces a temperature rise along the bar in advance of the desired warming curve shown for example at 32, 33, 34 and 35, respectively. Illustrated in FIG. 4a is the result of warming the cold end of the bar to temperature $T_A$ in which a temperature rise moves along the bar from the cold end toward the warm end in advance of the warming of the coldest portion of the bar. This causes an undesirable degree of mixing of the gases evolved during desorption. Bar 4 may be a tube connected both at the hot end and cold end to other apparatus at room temperature and there will accordingly be a portion of a physical structure such as 37 beyond the region of the uniform temperature gradient, and this portion of the bar will generally have a gradient toward ambient temperature such as 38 whereas the end 39 may have a temperature gradient from $T_A$ toward atmospheric temperature, whether this be above or below $T_A$.

While the temperature distribution illustrated in FIG. 4 is satisfactory for most purposes, a differing temperature distribution is illustrated in FIG. 4b which is both easier to realize and adequate for the purpose. In this instance the region of uniform temperature gradient is not disturbed except below the point of desorption. This is accomplished by use of apparatus illustrated in FIG. 10 in which a heat sink portion controlling the lower end of the temperature gradient is advanced from $T_N$ progressively toward $T_A$, permitting a rising minimum temperature to progress along the ΔT bar as the heat sink is moved through positions 41, 42, 43, 44 corresponding to temperatures in a fixed gradient bar continuously held at the original temperature gradient.

Thus points 45, 46, 47, 48 and 49 become in succession the lowest points of temperature along the T bar and can be varied continuously from $T_N$ to $T_A$.

Apparatus for providing the temperature distributions of FIG. 4b preferably consists of a bar or tube 4 as previously described and a second bar of thermally conductive material 50 held between two fixed temperature points 51 and 52, referred to as heat sink and heat source points. Since these points are continuously supplied with $T_A$ at heat source 52 and $T_N$ at fixed heat sink 51 no change with time occurs along the fixed temperature gradient control bar 50. A sliding thermal connector bar or other conducting medium 40 is placed substantially at heat sink 51 during the adsorption phase. A fixed thermal connector 53 continuously connects a point near the fixed source 52 to that portion of the ΔT bar 4 intended to be held at the temperature $T_A$. When it is desired to desorb the accumulated deposits the sliding connector 40 is merely moved along the fixed temperature gradient control bar. This does not in any way affect the temperature on the ΔT bar above the temperature of connector 40 inasmuch as this is now the heat sink, which progresses along a temperature gradient identical to that along the ΔT tube during adsorption. Regions of the bar 4 beyond the temporary connecting point to the temperature control bar are allowed to coast or to warm to ambient temperature generally in accordance with gradient lines 38 of FIG. 4b. With this arrangement a sharply defined minimum point in temperature is maintained at all times on bar 4 and this minimum temperature may be changed continuously as desired between the fixed sink temperature and the fixed source temperature.

Thermal conductor 40 may be a sliding bar making good contact between bar 4 and bar 50 wherein insulation 54, always assumed to surround the ΔT bar apparatus of this invention, has therein ΔT bar 4 and fixed temperature gradient control bar 50 connected by a sliding thermal connector generally shown at 40. Increased efficiency of thermal connection between the two bars is provided as in FIG. 10a by means of a thermally conducting fluid surrounding a small section of both bars within a chamber comprising walls 55 and ends 56 fitted with O-rings at either side thereof around bars 4 and 50. The space between the two ends of the thermal connector is filled with a highly conductive anti-freeze liquid or gas which does not solidify or boil between the temperatures $T_N$ and $T_A$. Where the lowest temperature introduced is about −40° mercury may be employed. Where lower temperatures are required other liquids or gas may be required. Walls 55 and 56 are preferably of insulating material except when chamber 54 is evacuated to prevent heat losses to or absorption from the surrounding space. While FIGS. 10a and 10b illustrate one manner in which the desorbing portion of the ΔT bar may be controlled in temperature other arrangements may be employed. It will be appreciated that the hot end of the ΔT bar remains fixed at the temperature $T_A$ of a corresponding point on the control bar. The entire temperature gradient control bar remains fixed at all times. The two bars have corresponding lengths between the positions of $T_A$ and $T_N$ but the position of bar 40 is advanced toward the hot end to achieve desorption at temperatures such as $T_1$, $T_2$, $T_3$, and $T_4$ to evaporate particular constituents which may be condensed along the interior of bar 4.

A further means of sequentially removing condensates is illustrated in FIG. 11 in which a ΔT bar 4, in this case a tube, is held initially to fixed temperatures at 51 and 52 to provide the uniform temperature gradient during condensation, and is surrounded throughout the region of the temperature gradient by a second tube 60 having a heating coil 61 therearound. Tube 60 is closed in fluid-tight contact with tube 4 at a lower end and has a fluid inlet 64 for supplying a fluid 65 to variably fill tube 60. Floating element 66 carries a reflective radiation barrier cylinder 67 to avoid heating of the bar by radiation from tube 60. In this instance stripping is applied progressively from the cold end towards the hot end of the tube as fluid is admitted through inlet 64 to different levels corresponding to $t_1$, $t_2$, $t_3$, and $t_4$. Fluid 65 is a thermally conducting liquid which transfers heat to the walls of tube 4, the level of contact being gradually raised. Progressively higher rises in temperature may be achieved by varying the heating current, or tube 60 is preferably raised to a temperature substantially above the temperature of the hot end and fluid 65 may be admitted at a controlled rate such that the gases are stripped rapidly by a rapidly advancing temperature wave beginning at the cold end. When this temperature rise is made sufficiently rapid and progressive a balance is achieved in which the temperature rise in advance of the rising liquid level in tube 60 is largely avoided, thus approximating the idealized temperature distribution of FIG. 4 shown at $t_3$. Alternatively, tube 4 may be warmed by direct radiation from a coil 61 disposed about tube 4, fluid container 60 being omitted, but coil 61 being progressively advanced from the cold end toward the hot end. It will be seen that a too rapid advancement in proportion to the rate of heat supply is represented by a curve approximating curve b of FIG. 4 and a too slow advancement provides a curve c or some other curve intermediate between curve c and those represented in FIG. 4a. For a particular rate of heat application by radiation from coil 61 and a particular rate of advancement of the coil from the cold toward the hot end of the tube a curve such as a is obtained in which the tail at the junction of the horizontal line and the temperature gradient line is minimized.

FIG. 12 illustrates a different mode of stripping condensed gases from tube 4 in which tube 4 is employed as heretofore described and is supplied with a heat sink at 51 and a heat source at 62, which heat source can also be cooled to substantially the temperature of heat sink 51. This may be accomplished by circulating liquid nitrogen, or the like, through a tubular coil contacting bar 4 to provide $T_N$ at one point while heating the second fixed point on bar 4 by a tubular coil carrying a liquid at temperature $T_A$, such as water at boiling temperature. When the gases have been suitably separated within the tube 4 the hot water is then removed from heat source 62 and liquid nitrogen is circulated therethrough for a time sufficient to bring the entire tube 4 to the temperature $T_N$. When equilibrium has been established a heating coil 66 surrounding substantially the full length of the temperature gradient region may be gradually energized to slowly raise the temperature from $T_N$ toward $T_A$, the entire bar being raised at the same time. In this way idealized uniform temperatures corresponding to degrees of heating as at 32, 33, 34 and 35 in FIG. 4 are achieved, there being no temperature gradient remaining in the tube. This procedure accurately strips the condensed gases from the tube in timed sequence according to their respective vaporization temperatures.

In one condensation separation experiment, atmospheric gas was passed through a tube for one minute at high velocity, without attaining a true equilibrium. The thermal gradient was established between ambient water temperature (nominally 300°K) and a liquid nitrogen trap (nominally 78°K). Desorption was accomplished by removing the liquid nitrogen from the end of the tube and replacing it with a bath of water. This resulted in a thermal transient, which in part was reflected up the entire tube somewhat according to FIG. 4a. FIG. 5 illustrates the total pressure transient observed on a mass spectrometer connected to the tube during the resulting desorption. At several points during the desorption, oscilloscope traces were taken showing a large carbon dioxide signal and also a large hydrocarbon signal, and suggesting toluene, which is a cleaning solvent frequently used in the laboratory where the test was made. This data illustrates the need for optimizing the various parameters and control of warming temperature distribution so as to approach the theoretical conditions of FIG. 9 and the sharply defined points of desorption according to FIG. 4 or 4b.

The use of helium as a carrier gas during condensation offers further control of relative concentrations for optimizing the peak sharpness of the spectrum.

In the example of desorption in which heat is applied so rapidly as to override the tailing effect in the gradient region above the point of advancing temperature wave it is noted that a very rapid heat flow and corresponding advancement of the point of application provides a very rapid desorption. This has the advantage of permitting shortened condensation times for any factor of enrichment since it is the ratio of adsorption time to desorption time which determines the effective factor of enrichment.

While this invention has been described in relation to separating and detecting constituents of a gas mixture it is to be understood that the term gas is used broadly, and that vapors are comprehended, whether in gaseous form or partly in the form of suspended droplets or mist which may be evaporated into gaseous form at the hot end and condensed on the bar in ordered sequence. Liquid and some solids carried as part of a gas mixture may also be collected adjacent the warm end of the bar without conversion to a gaseous form being segregated from other constituents and stripped at their respective boiling temperatures at the prevailing pressure.

I claim:

1. The method of concentrating and measuring quantities of gases in a mixture comprising the steps of,
    flowing said mixture progressively along a thermally conducting surface held to a temperature gradient between a warm end and a cold end thereof at a rate to substantially equalize gas temperatures to the temperature of said surface at each location therealong, said cold end being at a temperature for substantially complete condensation of said gases,
    continuing said gas flow for a period sufficient to collect measurable quantities of each constituent of interest,
    terminating gas flow prior to blockage of flow by collected condensate of any constituent of the mixture,
    sequentially elevating the temperature of successive portions of said surface, beginning at the temperature at said cold end to evaporate constituent gases in succession, and
    measuring constituent gases one at a time as they are evaporated.

2. In the method of claim 1, said surface having a warm end at substantially ambient temperature and a cold end at substantially the temperature of liquid nitrogen.

3. In the method of claim 1, said warm end being at elevated temperature during condensation.

4. In the method of claim 1 said warm end being cooled for an interval after termination of gas flow to substantially the evaporation temperature for the last to condense gas collected, said surface then being warmed as a unit.

5. In the method of claim 1 said surface being warmed progressively therealong from said cold end through the temperature range from said cold end to said warm end without warming said surface at any region except at that region then at the lowest temperature therealong.

6. In the method of claim 1 said evaporated gases being withdrawn by exhausting into an evacuated region before measurement.

7. In the method of claim 1 said step of elevating the temperature comprising establishing thermal equilibrium at successive points therealong with a rising temperature function, and further elevating the temperature of other portions of the surface formerly at lower temperatures.

8. In the method of claim 1, the rate of flow being controlled to effect diffusion of gas mixture to said surface in not substantially more than 5°K of temperature gradient on said surface.

9. In the method of claim 1 the quantity of gas in said mixture and the rate of flow within a flow passage being adjusted to cause condensation of constituent gases to occur at discrete locations along said surface.

10. In the detection of gaseous contaminants in a sample of atmospheric gas the steps of,
    subjecting said sample to a progressively decreasing temperature by moving the sample along a thermally conducting surface held at a predetermined temperature gradient between upper and lower fixed temperatures at a heat source and heat sink, respectively,
    supplying heat at said source and withdrawing heat at said sink to maintain said temperature gradient until gases of the sample condensable at or above said lower temperature are condensed seriatim along said surface,
    providing a reverse flow of carrier gas from said lower temperature of said surface to said upper temperature,
    progressively raising the temperature of lower temperature portions of the surface to successively evaporate condensed gases, and
    detecting in succession quantities of gases evaporated in inverse order of their deposition.

11. In the method of claim 10, said sample being passed from ambient temperature to liquid nitrogen temperature along an elongated surface.

12. In the method of claim 10, said step of subjecting the sample to progressively decreasing temperature comprising flowing said sample through a walled passage in contact therewith between said heat source and said heat sink.

13. In the method of claim 10, said step of raising the temperature of lower temperature portions of the surface comprising controlling in succession the temperature at respectively warmer points along said surface according to said gradient during condensation while increasing the temperature of portions colder than said controlled points.

14. In the method of claim 13 said control in succession of warmer portions of the surface comprising equalizing the temperature of successive portions of surface with corresponding temperatures in a maintained reference temperature gradient.

15. In the method of claim 10 said sample being a residual gas in a vacuum chamber, said surface being held at a temperature gradient in an auxiliary passage extending along at least a substantial portion of the vacuum chamber and open thereto at one end, while exhaust pumping the passage at the other end to cause residual gas flow along said surface at a controlled rate of temperature decrease.

16. Apparatus for segregating quantities of gases in a mixture, comprising
   means including a conduit for conducting said mixture along a path,
   thermally conductive bar means presenting an elongated surface adjacent said path,
   heat flow means for progressively controlling the temperature of said bar means to provide therealong a temperature gradient comprehending the sequential condensation temperatures of said gases,
   means for controlling gas flow to govern the amount of the several gases condensing seriatim on said surface, and
   means for warming said bar means progressively from the low temperature end of the thermal gradient to evaporate said condensed gases in succession.

17. Apparatus according to claim 16, said means controlling gas flow including conduit valves for controlling rate and amount of the mixture admitted.

18. Apparatus according to claim 16 including means for exhausting into an evacuated space the constituent gases as they are successively evaporated.

19. Apparatus according to claim 16 including means supplying a carrier gas flow in reverse direction along said path to convey evaporated gases in succession.

20. Apparatus according to claim 16, said means for warming the bar means including heat conductive means in thermal contact therewith at the low temperature end of said thermal gradient and means for progressively warming said heat conductive means.

21. Apparatus according to claim 20, said heat conductive means comprising a metallic member in thermal contact with and slidable along said bar, said means for warming comprising means for thermally engaging successive regions on a thermally conductive member held to a reference gradient.

22. Apparatus according to claim 16, said bar means comprising a solid metallic element extending from a first heat exchanger at one temperature to a second heat exchanger at a second temperature, one said temperature being below the boiling points of constituent gases to be condensed from the mixture.

23. Apparatus according to claim 22, said heat exchangers comprising liquid baths surrounding respective portions of said element, of which the liquids have higher and lower boiling points, respectively, than the gases of the mixture.

24. Apparatus according to claim 16, said bar means comprising a linear metallic tube connected to receive therein said gases passing along said path.

25. Apparatus according to claim 24 said tube having a length to diameter ratio not substantially less than 20.

26. Apparatus according to claim 24, including means for connecting said tube to a source of supply for said mixture during condensation and means for supplying a flowing carrier gas during evaporation of condensed gases.

27. Apparatus according to claim 24, said tube diameter being proportioned to rate of gas supply to provide a flow rate not substantially greater than 1.5 cm/sec.

28. Apparatus according to claim 24, said tube having a thermal gradient not over about 2°K/cm.

29. Apparatus according to claim 16, said bar comprising a thermal gradient tube, a second thermally conductive bar means having said thermal gradient maintained thereon by a heat source and a heat sink, said means for controlling the temperature of said bar means comprising a thermal conductor element connecting the second bar to said tube at the high temperature end and a second thermal conductor connecting the second bar to the tube at the low temperature end.

30. Apparatus according to claim 29, and means for moving said second thermal conductor progressively along the second bar to cause a rising temperature control at respective points on the tube.

31. The method of isolating trace constituents of a gas mixture comprising subjecting said mixture to progressively lowered temperature in contact with a thermally conductive surface held to a fixed temperature gradient comprehending successive condensation temperatures of said constituents thereby to separatively remove said constituents from the mixture.

32. The method of partially separating constituents of a residual gas in an enclosure comprising subjecting a region within said enclosure to a temperature gradient comprehending condensation temperatures for constituents to be separated by maintaining said gradient on a thermally conductive surface disposed in said region between points of heat supply to this surface and heat withdrawal from the surface, thereby to produce constituent condensations separately along portions of said surface according to temperature therealong.

33. Apparatus for segregating trace constituents of a progressively advanced vapor mixture, comprising
   thermally conductive bar means disposed adjacent the path of vapor advancement in contact therewith, means including a heat source for fixing the temperature at the first end of said bar means, means including a heat sink for controlling the temperature at a second end of said bar means so as to establish a condensation temperature spacing along the bar means comprehending condensation temperatures for each of said trace constituents to be segregated.

34. Apparatus according to claim 33, including value means for controlling flow rate and dwell time of mixture portions advancing along the temperature gradient.

35. Apparatus according to claim 34, including means for stripping constituents deposited in succession along said gradient, being means for warming said bar means from the heat sink end toward the heat source end within a time interval made sufficiently small with respect to the interval during which advancing gas constituents are deposited to provide a desired factor of enrichment of said constituents as stripped from the bar means.

* * * * *